US011276145B2

(12) United States Patent
Zhou et al.

(10) Patent No.: US 11,276,145 B2
(45) Date of Patent: Mar. 15, 2022

(54) SEAMLESS PREVIEW STITCHING FOR MULTIPLE CAMERAS

(71) Applicant: Apple Inc., Cupertino, CA (US)

(72) Inventors: Jianping Zhou, Cupertino, CA (US); Walker Eagleston, Cupertino, CA (US); Tao Zhang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 176 days.

(21) Appl. No.: 16/835,551

(22) Filed: Mar. 31, 2020

(65) Prior Publication Data

US 2021/0073941 A1 Mar. 11, 2021

Related U.S. Application Data

(60) Provisional application No. 62/896,912, filed on Sep. 6, 2019.

(51) Int. Cl.
*G06K 9/00* (2006.01)
*G06T 3/40* (2006.01)
*H04N 5/247* (2006.01)
*H04N 5/232* (2006.01)
*G06T 3/00* (2006.01)

(52) U.S. Cl.
CPC .......... *G06T 3/4038* (2013.01); *G06T 3/0068* (2013.01); *H04N 5/232* (2013.01); *H04N 5/247* (2013.01)

(58) Field of Classification Search
CPC ..... G06T 3/4038; G06T 3/0068; H04N 5/232; H04N 5/247; H04N 5/2624; H04N 17/002

USPC .......................................................... 382/100
See application file for complete search history.

(56) References Cited

U.S. PATENT DOCUMENTS

| 2002/0122113 A1* | 9/2002 | Foote ........................ G06T 7/97 348/48 |
| 2011/0142366 A1* | 6/2011 | Young .................... G06T 3/4069 382/274 |
| 2018/0122078 A1* | 5/2018 | Polavarapu ........... G06T 3/4038 |

* cited by examiner

*Primary Examiner* — Stephen P Coleman
(74) *Attorney, Agent, or Firm* — BakerHostetler

(57) ABSTRACT

Systems and methods for stitching videos are disclosed. Image-based registration between frames from a first video source and frames from a second video source is performed at a first rate. Calibration-based registration between frames from the first video source and frames from the second video source are performed at a second rate higher than the first rate. Then, for a first frame from the first video source for which calibration-based registration data and image-based registration data have been generated, a stitching transform that maps the first frame to a counterpart frame from the second video source based on image-based registration data is generated. A delta transform from the image-based registration data and the calibration-based registration data at the first frame is also derived. For a subsequent frame from the first video source for which calibration-based registration data have been generated, but no image-based registration data have been generated, a stitching transform that maps the subsequent frame to a counterpart frame from the second video source based on the calibration-based registration data and the delta transform is generated. Frames from the first video source and frames from the second video source are stitched according to their respective generated stitching transforms.

28 Claims, 6 Drawing Sheets

100

200

300

400

500

600

SEAMLESS PREVIEW STITCHING FOR MULTIPLE CAMERAS

CROSS REFERENCE TO RELATED APPLICATION

This application claims the benefit of U.S. Provisional Application No. 62/896,912 filed on Sep. 6, 2019, the disclosure of which is incorporated by reference herein.

BACKGROUND

The present disclosure refers to techniques for stitching of video images, in particular, to techniques of image alignment that employ image-based registration (IBR) and calibration-based registration (CBR).

Many modern consumer electronic devices are equipped with multiple built-in cameras that are integrated into fixed positions within the devices and possess different intrinsic characteristics. Some application generate composite "stitched" images from outputs of the camera forming a composite view of a captured scene. Techniques for stitching multiple images often utilize registration methods to align the images spatially, and blending methods that merge the aligned images' content. Typical image registration techniques, however, involve resource-intensive image processing techniques that search for commonality in content among multiple images. They can be inappropriate for use in many consumer computing environments such as smartphones, which typically have fewer processing resources than more robust computing environments provided, for example, by personal computers. Thus, there is a need in the art for an image stitching technique that achieves high accuracy and yet lowers resource consumption.

DETAILED DESCRIPTION

Aspects of the present disclosure describe systems and methods for stitching videos with reduced resource consumption. Image-based registration may be performed between frames of video from multiple video sources a cadence representing some sub-set of frames output by the video sources. Calibration-based registration may be performed between the frames of video from the video sources at a second rate higher than the first rate. For frames for which calibration-based registration data is available but image-based registration data is not available, a stitching transform may be derived from the calibration-based registration data available for the respective frame and from delta information representing a change between that frame and another recent frame for which image-based registration data was available Such techniques reduce the rate at which image-based registration processes are performed and, thus, conserve processing resources consumed by a stitching process.

When an external event occurs during a stitching operation, for a frame from the first video source that succeeds the external event, in an aspect, the method may perform image-based registration and calibration-based registration between the succeeding frame from the first video source and a counterpart frame from the second video source and may output, respectively, image-based registration data and calibration-based registration data. Then, the method may update the delta transform based on the image-based registration data and the calibration-based registration data at the succeeding frame. The updated transform may serve to generate stitching transforms for subsequent frames based on their respective calibration-based registration data.

The systems and methods for stitching videos, described in the present disclosure, propose techniques for efficient stitching operations. Calibration-based registration techniques, typically, provide for low complexity processes at the price of reduced alignment accuracy. On the other hand, image-based registration techniques are relatively complex, however, result in a more accurate alignment between the corresponding video frames. Thus, aspects of the present disclosure, describe techniques in which calibration-based registration may be performed in a higher rate than image-based registration, wherein alignment of frames that is carried out by calibration-based registration may be refined by alignment performed for a previous frame by image-based registration. Such approach allows for overall video stitching operations that are more efficient and accurate, as explained in more detail below.

Figure 1:
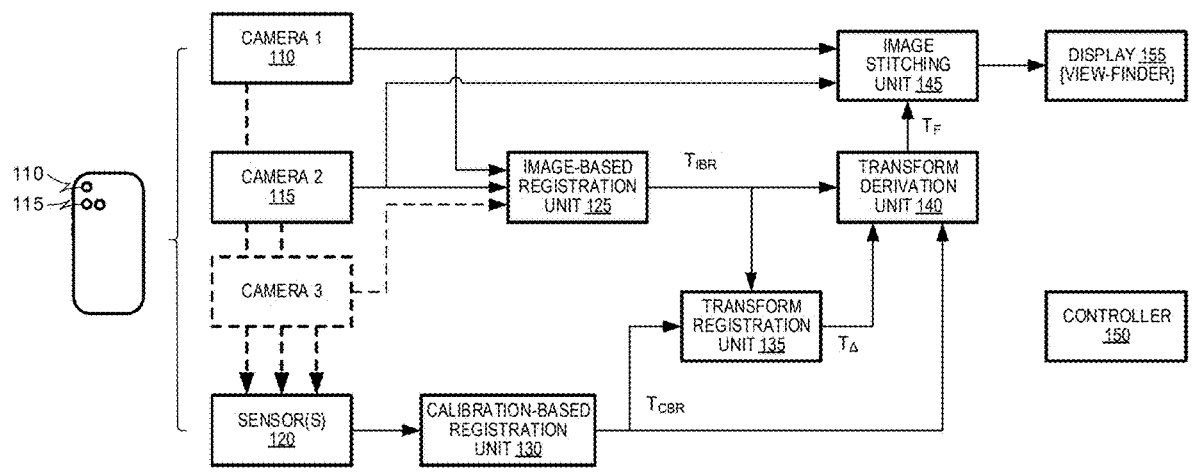
FIG. 1 is a functional block diagram illustrating a stitching system according to an aspect of the present disclosure.

FIG. 1 is a functional block diagram of a fusion (stitching) system 100 according to an aspect of the present disclosure. The system 100 may include a plurality of cameras 110-115 and associated sensors 120, an image-based registration unit 125 and a calibration-based registration unit 130, a transform registration unit 135, a transform derivation unit 140, and an image stitching unit 145. The system 100 may operate under control of a controller 150.

The first registration unit 125 may perform registration operations based on matching of corresponding content from images output by two or more cameras 110, 115 and, hence, is called an "image-based registration unit," for convenience. It may output registration data $T_{IBR}$ to the transform registration unit 135 and to the transform derivation unit 140. The second registration unit 130 may perform registration operations based on calibration data derived from sensors 120 outputting second registration data $T_{CBR}$; for convenience, it is called a "calibration-based registration unit" herein. The transform registration unit 135 may synchronize outputs $T_{IBR}$ and $T_{CBR}$ from the image-based registration unit 125 and the calibration-based registration unit 130, respectively, and may output registration data $T_A$ to the transform derivation unit 140. The transform derivation unit 140 may derive an image transform $T_F$ from these sources of registration data: $T_{IBR}$, $T_{CBR}$, and $T_A$. The transform $T_F$ may then be applied by the image stitching unit 145 to generate a composite image from image content provided by the cameras 110, 115. The composite image may be output to other components such as a display 155 or storage (not shown).

The system 100 may be used in a variety of applications wherein captured images that are spatially related are aligned to form a single composite image. In a first use case, composite image data may be output to a display 155 of a consumer device, such as a smartphone or tablet computer, when performing media capture events. Consumers may use real-time video output from such devices as a "viewfinder" of sorts to assist them to compose captured media. In another application, the composite image or a sequence of such images may be stored on such a device as captured media.

The cameras 110, 115 typically are mounted within a common device in a manner that provides overlapping fields of view between them. The cameras 110, 115, however, may have different properties from each other owing to differences such as pixel counts/resolutions, optical systems, and control systems. For example, one camera 110 may be designed to have a relatively narrow field of view, a relatively shallow depth of field, and/or a relatively high pixel count as compared to the second camera 115. As a corollary, the second camera 115 would have a relatively wider field of view, a relatively deeper depth of field, and/or a relatively low pixel count as compared to the first camera 110. The cameras 110, 115 may operate according to independently-controlled optical image stabilization (OIS) systems, which may apply spatial translation to their image sensors in an effort to counteract translational effects introduced by the operators or the environment (for example, shaking hands or ambient vibrations). The cameras 110, 115 are typically mounted in proximity to each other but spaced apart by a known distance with different orientations. Accordingly, while the images generated by each camera may spatially overlap, their content will likely differ from each other.

Image-based registration 125 typically involves a search for matching content between spatially related images, such as images output by two or more cameras 110, 115, to determine correspondence between them. Such registration 125 may generate a spatial mapping operator ($T_{IBR}$) that, when applied 145, provides for spatial alignment of the two images. Image-based registration 125 may compare intensity patterns between images output from the cameras 110, 115 using metrics such as correlation metrics. Image-based registration may be combined with a geometry-based registration. For example, image-based registration may be initialized with a geometry-based registration by first aligning the two images based on a search for correspondence between geometrical features in each image, such as points, lines, and contours, or a combination of such features. Thus, the image-based registration unit 125 may develop a geometrical transform $T_{IBR}$ between content of the two cameras' images, which maps content of one image (for example, content of a narrower field of view camera 110) to content of a second image (content of the wider field of view camera 115). In one aspect, the transform may represent homographies of features within image content and may be employed to map the features from one image to the next. The transformation may thus allow for alignment between the cameras' images for use by image stitching 145.

Calibration-based registration 130 may involve derivation of geometric transforms between image content based on the characteristics of the cameras 110, 115. As discussed, the cameras 110, 115 may be mounted within a device in a fixed physical relationship with each other—a distance of separation and different orientations within the device—which establishes relationships between the cameras' respective fields of view. The cameras 110, 115 may have predetermined operating characteristics such as their pixel counts, sizes of their fields of view, lenses' position, and OIS settings. A calibration-based registration unit 130 may derive geometric transforms $T_{CBR}$ that align image content output by the cameras 110, 115 based on sensor data and data representing the predetermined characteristics of the cameras 110, 115.

Generally, calibration-based registration data are a function of the relative position and orientation of the cameras 110, 115, as well as, the cameras' intrinsic characteristics and operational settings. In an aspect, calibration-based registration data $T_{CBR}$ may be derived as follows:

$$T_{CBR} = P_1 \cdot R \cdot P_2,$$

where R is a rotation matrix representing an orientation and/or displacement difference between the cameras 110, 115, P1 is a projection matrix representing intrinsic characteristics of the first camera 110, accounting for its focal length, optical center, optical image stabilization settings and the like, and P2 is the inverse of a projection matrix representing intrinsic characteristics of the second camera 115, accounting for its focal length, optical center, optical image stabilization settings and the like.

As discussed, the transform registration unit 135 may synchronize output from the image-based registration unit 125 and the calibration-based registration unit 130. The transform registration unit 135 may develop a baseline registration between the cameras' image content based on the registration transforms, $T_{IBR}$ and $T_{CBR}$, developed by the image-based registration unit 125 and the calibration-based registration unit 130. Typically, in operation, image-based registration 125 may be applied to frames output by the cameras 110, 115 at a predetermined rate, which is lower than a rate at which calibration-based registration 130 is performed. Frames for which both image-based and calibration-based registration data are generated are referred to herein as "synchronization frames," for convenience, while frames for which only calibration-based registration data are generated are referred to herein as "intermediate frames," also for convenience. Thus, the transform registration unit 135 may generate "delta" registration data at the synchronization frames for which $T_{IBR}$ data and $T_{CBR}$ data are available, to be saved and used later for the stitching of intermediate frames. In an aspect, given image-based registration data $T_{IBR}$ and calibration-based registration data $T_{CBR}$, a transform registration unit 135 may derive the delta transform $T_\Delta$ as:

$$T_\Delta = T_{IBR} \cdot T_{CBR}^{-1}.$$

The transform derivation unit 140 may derive transform(s) to be used by the image stitching unit 145 according to registration data $T_{IBR}$, $T_{CBR}$, and $T_\Delta$ supplied to it. For synchronization frames for which the image-based registration unit 125 generates registration data $T_{IBR}$, the transform derivation unit 140 may generate a transform from the $T_{IBR}$ data. For intermediate frames for which image-based registration data $T_{IBR}$ is not available, the transform derivation unit 140 may generate a transform from these frames' $T_{CBR}$ data and the $T_\Delta$ data generated at prior synchronization frame for which $T_{IBR}$ was available. In an aspect, the transform derivation unit may derive a final transform $T_F$ for those frames where image-based registration data $T_{IBR}$ is not available according to:

$$T_F = T_\Delta \cdot T_{CBR}.$$

Once a final transform $T_F$ is available, the image stitching unit 145 may perform image stitching to generate a composite image from images output from the cameras 110, 115.

Figure 2:
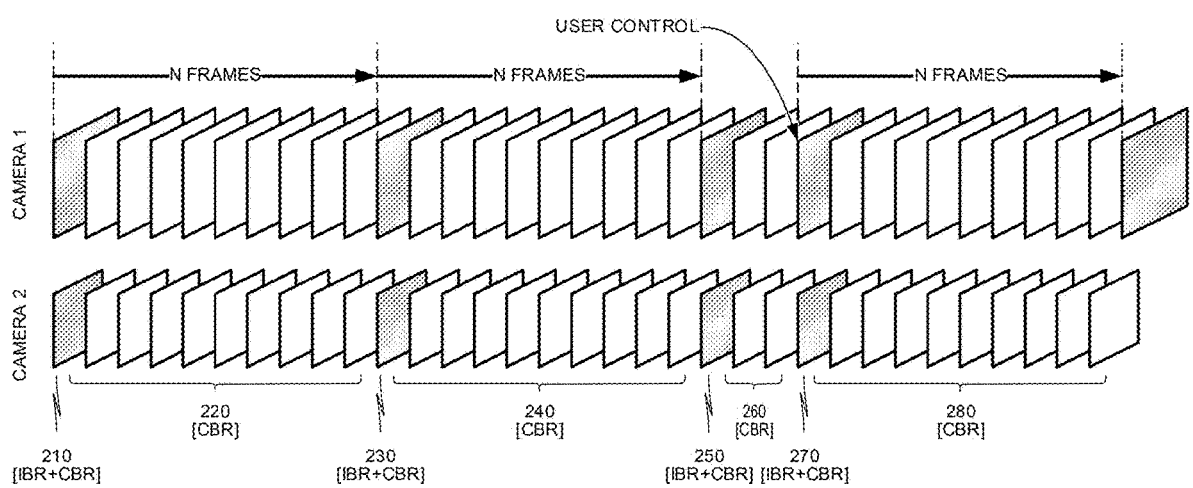
FIG. 2 is an exemplary frame sequence illustrating aspects of the present disclosure.

FIG. 2 illustrates an exemplary sequence of frames output by a pair of cameras 1 and 2 that may find application with the system of FIG. 1. Image-based registration data 125 (FIG. 1) may be generated for synchronization frames 210, 230, 250 at a predetermined rate, shown as once per every N frames. Calibration-based registration data 130 (FIG. 1) may be generated for all the frames illustrated: the synchronization frames 210, 230, 250 on which image-based registration is applied and the intermediate frames (shown as spans 220, 240) between those frames 210, 230, 250 for which registration is applied based on respective calibration-based registration data and the image-based registration data that was generated at a prior synchronization frame.

As discussed, synchronization may be performed between the image-based registration and calibration-based registration for those frames 210, 230, 250 for which image-based registration results are available and the delta transform $T_A$ between the image-based and calibration-based registration is updated and saved. For frames that follow these synchronization frames (e.g., frames in the span 220 that follow synchronization frame 210), image transforms may be derived based on the transforms developed by the calibration-based registration data $T_{CBR}$ at the current frame and the preceding delta transform $T_A$ from the synchronization frame 210.

As discussed, synchronization frames 210, 230, 250 may be developed at a regular cadence, such as once per every N frames. Yet, it may occur that the regular cadence is interrupted by an external event, such as a user control or other operational events that cause image-based registration results (and thus the current delta transform $T_A$ data) to become obsolete. In response to such an event, the system 100 (FIG. 1) may initiate a new synchronization process (shown at frame 270), which may generate a new set of image-based registration data and update the delta transform $T_A$. Thereafter, the regular cadence may resume.

Operation of the system 100 of FIG. 1 is expected to conserve processing resources in a device as compared to alternative techniques that apply image-based registration continuously. Calibration-based registration transforms, when compared to image-based registration transforms, are relatively inexpensive to calculate because they are derived from offline calibration data and small amounts of data provided by sensors 120 (FIG. 1) on a device. By contrast, image-based registration transforms tend to incur relatively high resource costs because they involve algorithms that employ searches among corresponding content of multiple images to identify correlation and often such algorithms have to be applied iteratively. Thus, by limiting the rate at which image-based registration operations are performed, resource conservation can be achieved.

Moreover, the proposed techniques are expected to achieve higher-quality results than techniques that are driven solely by calibration-based registration results. Calibration-based registration techniques are often incapable of correcting for certain image artifacts such as parallax effects. The proposed techniques, however, adjust transforms identified by image-based registration according to differences between calibration-based results across frames and, thus, most correction of parallax effects can be achieved.

Figure 3:
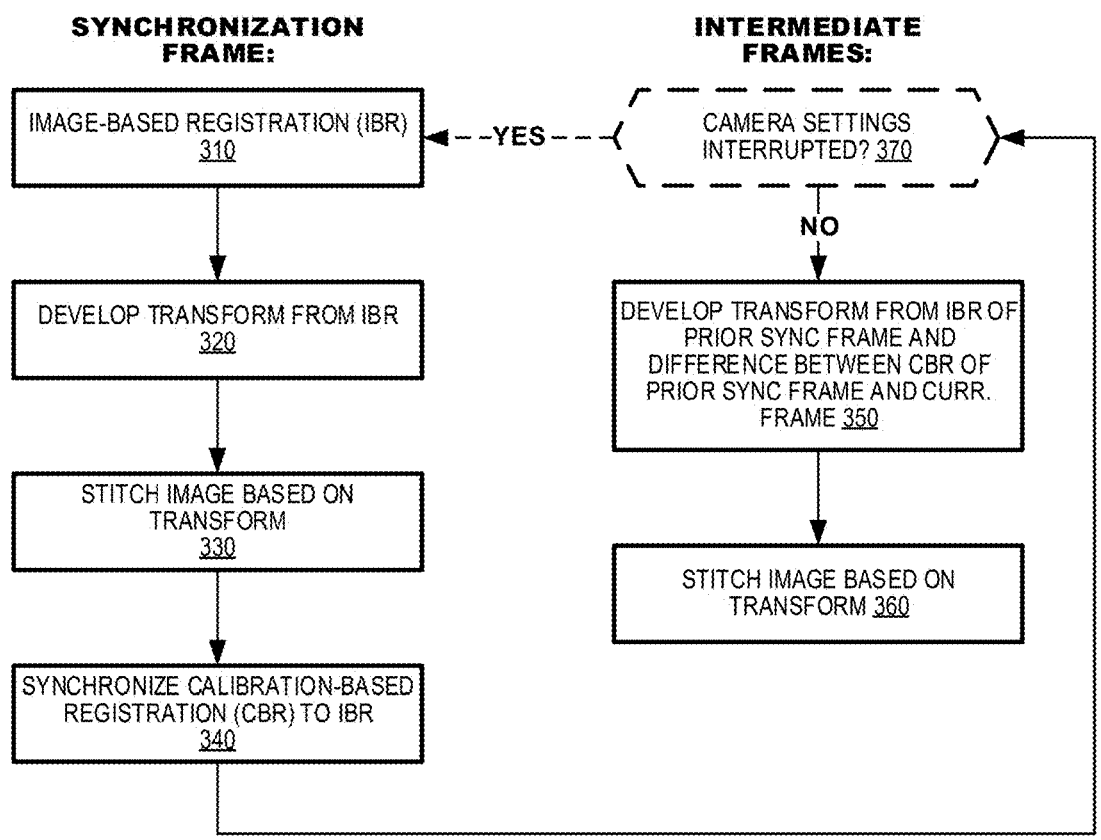
FIG. 3 is a high-level flowchart according to an aspect of the present disclosure.

FIG. 3 illustrates a method 300 according to an aspect of the disclosure. The method 300 may begin during processing of a synchronization frame from which image-based registration and calibration-based registration results are generated (boxes 310-340). The method 300 may begin by performing image-based registration on images generated by two or more cameras (box 310). The method 300 may develop a stitching transform from the image-based registration (box 320) and stitch the images from the camera based on the transform (box 330). The method 300 also may synchronize calibration-based registration data to the image-based registration data and update the delta transform $T_A$ between two registration methods (box 340).

The method 300 also may process intermediate frames that occur between consecutive synchronization frames (boxes 350-370). For each intermediate frame, the method 300 may develop a stitching transform according to the delta transform $T_A$ generated at a prior synchronization frame and according to calibration-based registration data at the current intermediate frame (box 350). The method 300 may stitch the images together according to the transform (box 360). In an aspect, prior to developing a transform for a new intermediate frame, the method 300 may determine whether an event has occurred that interrupted camera settings (box 370). If so, the method 300 may advance to box 310 and may treat the new frame as a synchronization frame rather than an intermediate frame.

Interruption of camera settings may occur in a variety of ways. In a first case, an interruption may be initiated by a user control, as may occur when a user changes an imaging mode of a device such as zoom settings. In a second case, an interruption may be induced by a device control, triggered by program applications executing on the device, that alters imaging modes of the camera. In cases where camera control events cause a prior image-based registration results to be rendered obsolete, the method 300 may advance to step 310 and generate new image-based registration results.

In another aspect, image-based registration need not occur at regular intervals. A method 300 may assess, from sensor settings, magnitudes of changes among camera settings. Optionally, when changes in camera settings remain within a predetermined threshold range, the method may defer processing of a new frame as a synchronization frame until the changes exceed the threshold range. Doing so can achieve further resource conservation.

In an aspect, the method 300 may perform different types of image stitching at boxes 330 and 360 depending on the circumstances. These aspects are discussed in connection with FIGS. 4 and 5 below.

Figure 4:
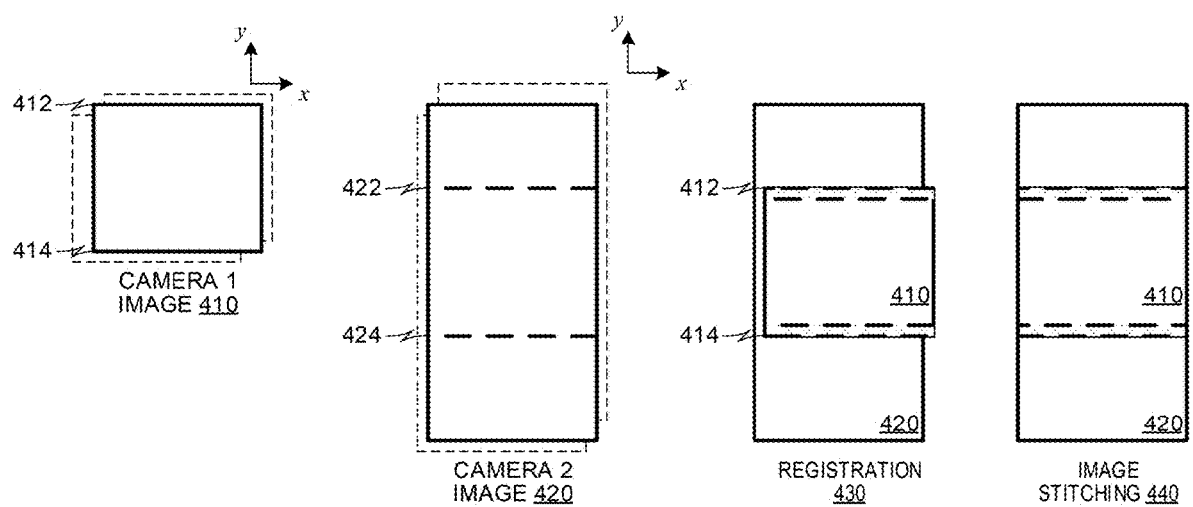
FIG. 4 illustrates an edge-based image stitching according to an aspect of the present disclosure.

FIG. 4 illustrates image stitching according to an aspect of the present disclosure. In this example, images 410, 420 supplied by cameras 1 and 2 have different fields of view and are subject to OIS techniques that vary relative position of the images 410, 420 in the x and the y directions. The image stitching technique may stitch the content of the images 410, 420 along edges 412, 414 of an image 410 that is with a narrow field of view. Thus, registration techniques 430 may provide transforms that may be applied to spatially align content of the two images 410, 420. Then, image stitching operations 440 may apply these transforms and merge the contents of the two aligned images 410, 420, including blending their contents along the edges 412, 414. Image stitching 440 may perform other operations to condition the composite image for consumption, for example, by cropping the composite image to fit an area of a viewfinder display (FIG. 1).

Figure 5:
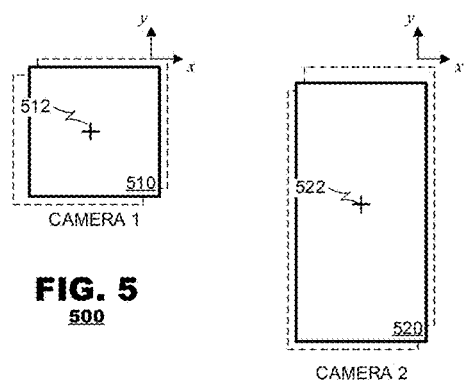
FIG. 5 illustrates centroid-based image transitions according to an aspect of the present disclosure.
Figure 5:
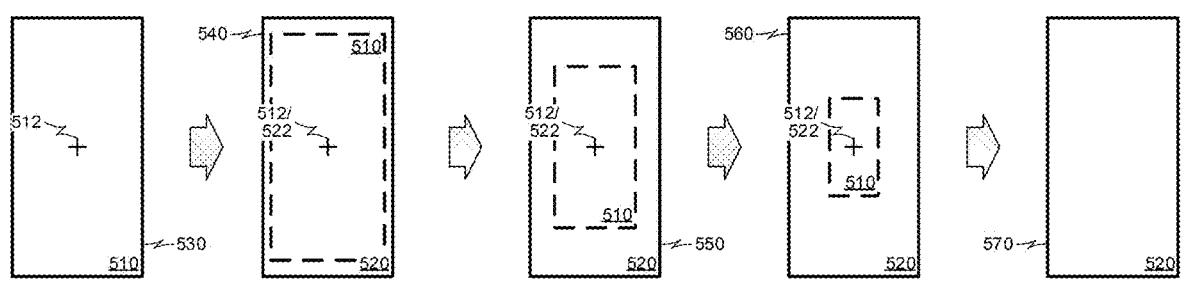

FIG. 5 illustrates an image stitching operation according to another aspect of the present disclosure. Such operations may find application when transitioning display of content between cameras. In such an example, the stitching operation may identify a salient element of image content, typically in a center area of a frame, and stitch content of the images together to maintain the element in a consistent location.

FIG. 5 illustrates an example of a stitching operation. In this example, the images 510, 520, captured by two cameras, are illustrated having respective common centers 512, 522. The illustrated image stitching operation is performed as content display transitions from the display of the first camera's image content to that of the second camera's image content, shown across frames 530-560.

Frame 510 illustrates display of content from image 510 prior to image stitching. In this example, image 510 may be cropped as may be appropriate for the dimensions of a display device. Due to a zoom transition or other control operation, the content of image 510 is reduced in size and ultimately replaced by the content of image 520 from another camera. In this case, image stitching may occur to align the content of the two images 510, 520 according to their common centers 512, 522, and the content of image 510 is blended at its border with the content of image 520. The content of images 510, 520 may be scaled in tandem at increasing smaller sizes until the content of frame 510 is removed from the display. At that point, the content of frame 520 would remain displayed and the transition will have completed.

Figure 6:
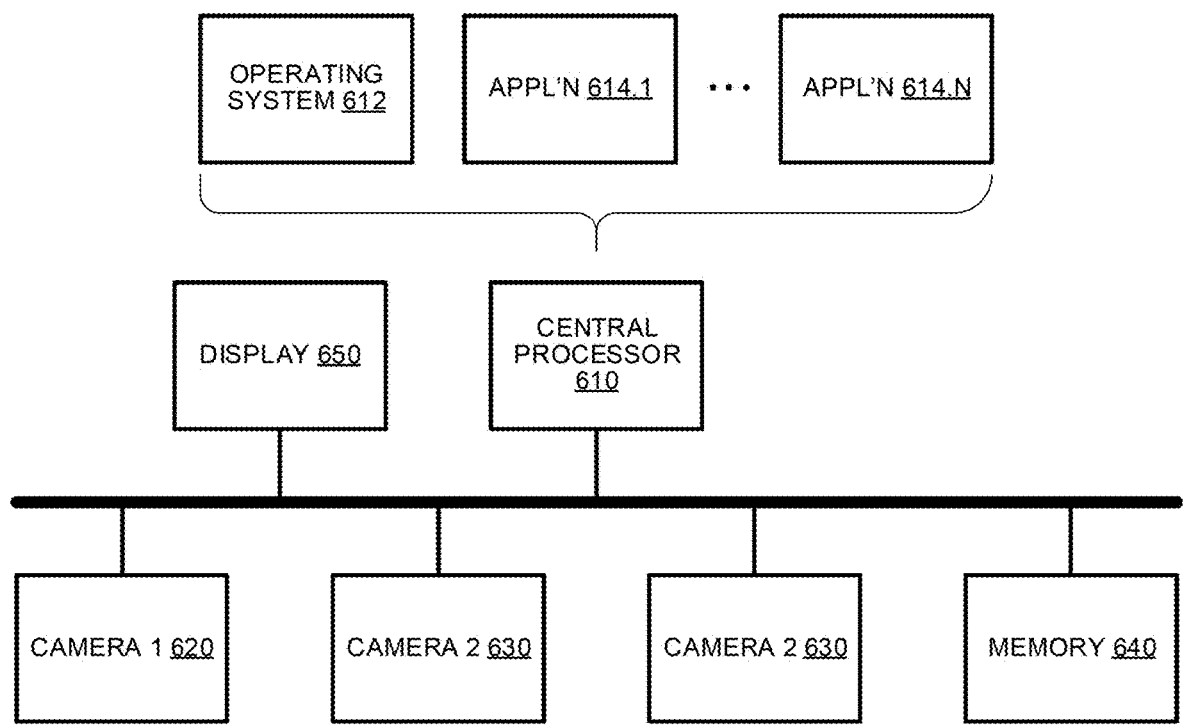
FIG. 6 is a system diagram according to an aspect of the present disclosure.

FIG. 6 is a system diagram of a processing system 600 according to an aspect of the present disclosure. The system 600 may include a central processor 610, a plurality of cameras 610-630 and associated sensors (not shown), a memory system 640, and a display 650. The processor 610 may execute program instructions, stored in the memory 640, that define an operating system 612 of the system 600, and one or more application programs 614.1-614.N. Operational features disclosed herein may be embodied in program instructions that are stored by the memory system 640 and executed by the central processor 610. These program instructions may be embodied as part of the operating system 612 or an application 614.1 as may be convenient.

We claim:

1. An image stitching method, comprising:
performing image-based registration between frames from a first video source and frames from a second video source and outputting image-based registration data, the image-based registration being performed at a first rate;
performing calibration-based registration between frames from the first video source and frames from the second video source and outputting calibration-based registration data, the calibration-based registration being performed at a second rate higher than the first rate;
for a first frame from the first video source for which calibration-based registration data and image-based registration data have been generated:
generating a stitching transform that maps the first frame to a counterpart frame from the second video source based on the image-based registration data at the first frame, and
deriving a delta transform from the image-based registration data and the calibration-based registration data at the first frame;
for a subsequent frame from the first video source for which calibration-based registration data have been generated, but no image-based registration data have been generated:
generating a stitching transform that maps the subsequent frame to a counterpart frame from the second video source based on the calibration-based registration data at the subsequent frame and on the delta transform.

2. The method of claim 1, further comprising stitching frames from the first video source and frames from the second video source according to their respective stitching transforms.

3. The method of claim 1, wherein the image-based registration data is derived from a comparison of frames output by the first video source and corresponding frames output by the second video source.

4. The method of claim 1, wherein the calibration-based registration data are derived from data representing optical characteristics of the first video source or the second video source.

5. The method of claim 1, wherein the calibration-based registration data are generated based on relative position or orientation of cameras of the first and of the second video sources.

6. The method of claim 1, wherein, responsive to an external event, for a frame from the first video source that succeeds the external event:
performing image-based registration between the succeeding frame and a counterpart frame from the second video source, outputting image-based registration data;
performing calibration-based registration between the succeeding frame and the counterpart frame from the second video source, outputting calibration-based registration data; and
updating the delta transform based on the image-based registration data and the calibration-based registration data at the succeeding frame.

7. The method of claim 6, wherein the external event is caused by a user control or by a device control.

8. The method of claim 1, wherein the calibration-based registration data are derived from data representing operational setting data of the first video source or the second video source.

9. The method of claim 8, wherein the operational setting data include settings of an optical image stabilization system of a camera.

10. A system comprising:
an image-based registration unit having inputs for frames from a first video source and frames from a second video source and having output for image-based registration data,
a calibration-based registration unit having inputs for operational setting data from the first video source and operational setting data from the second video source and having output for calibration-based registration data,
a transform registration unit having inputs for the image-based registration data and for the calibration-based registration data and having an output for a delta transform; and
a transform derivation unit having inputs for the image-based registration data, the calibration-based registration data, and the delta transform, and having an output for a stitching transform.

11. The system of claim 10, further comprising a stitching unit having inputs for frames from the first video source, frames from the second video source, and the stitching transform, and having an output for a composite image data.

12. The system of claim 10, wherein the system configured to:
for a first frame from the first video source for which calibration-based registration data and image-based registration data have been generated:
generate a stitching transform that maps the first frame to a counterpart frame from the second video source based on the image-based registration data at the first frame, and derive a delta transform from the image-based registration data and the calibration-based registration data at the first frame;

for a subsequent frame from the first video source for which calibration-based registration data have been generated, but no image-based registration data have been generated:

generate a stitching transform that maps the subsequent frame to a counterpart frame from the second video source based on the calibration-based registration data at the subsequent frame and on the delta transform.

13. The system of claim 12, wherein the image-based registration data is derived from a comparison of frames output by the first video source and corresponding frames output by the second video source.

14. The system of claim 12, wherein the calibration-based registration data are derived from data representing optical characteristics of the first video source or the second video source.

15. The system of claim 12, wherein the calibration-based registration data are generated based on relative position or orientation of cameras of the first and of the second video sources.

16. The system of claim 12, responsive to an external event, for a frame from the first video source that succeeds the external event, the system further configured to:

perform image-based registration between the succeeding frame and a counterpart frame from the second video source, outputting image-based registration data;

perform calibration-based registration between the succeeding frame and the counterpart frame from the second video source, outputting calibration-based registration data; and update the delta transform based on the image-based registration data and the calibration-based registration data at the succeeding frame.

17. The system of claim 16, wherein the external event is caused by a user control or by a device control.

18. The system of claim 12, wherein the calibration-based registration data are derived from data representing operational setting data of the first video source or the second video source.

19. The system of claim 18, wherein the operational setting data include settings of an optical image stabilization system of a camera.

20. A non-transitory computer readable medium having stored therein program instruction that, when executed by a processing device, cause the processing device to perform an image stitching method, comprising:

performing image-based registration between frames from a first video source and frames from a second video source and outputting image-based registration data, the image-based registration being performed at a first rate;

performing calibration-based registration between frames from the first video source and frames from the second video source and outputting calibration-based registration data, the calibration-based registration being performed at a second rate higher than the first rate;

for a first frame from the first video source for which calibration-based registration data and image-based registration data have been generated:

generating a stitching transform that maps the first frame to a counterpart frame from the second video source based on the image-based registration data at the first frame, and deriving a delta transform from the image-based registration data and the calibration-based registration data at the first frame;

for a subsequent frame from the first video source for which calibration-based registration data have been generated, but no image-based registration data have been generated:

generating a stitching transform that maps the subsequent frame to a counterpart frame from the second video source based on the calibration-based registration data at the subsequent frame and on the delta transform.

21. The medium of claim 20, further comprising stitching frames from the first video source and frames from the second video source according to their respective stitching transforms.

22. The medium of claim 20, wherein the image-based registration data are derived from a comparison of frames output by the first video source and corresponding frames output by the second video source.

23. The medium of claim 20, wherein the calibration-based registration data is derived from data representing optical characteristics of the first video source or the second video source.

24. The medium of claim 20, wherein the calibration-based registration data are generated based on relative position or orientation of cameras of the first and of the second video sources.

25. The medium of claim 20, wherein, responsive to an external event, for a frame from the first video source that succeeds the external event:

performing image-based registration between the succeeding frame and a counterpart frame from the second video source, outputting image-based registration data;

performing calibration-based registration between the succeeding frame and the counterpart frame from the second video source, outputting calibration-based registration data; and updating the delta transform based on the image-based registration data and the calibration-based registration data at the succeeding frame.

26. The medium of claim 25, wherein the external event is caused by a user control or by a device control.

27. The medium of claim 20, wherein the calibration-based registration data are derived from data representing operational setting data of the first video source or the second video source.

28. The medium of claim 27, wherein the operational setting data include settings of an optical image stabilization system of a camera.

* * * * *